US008326333B2

(12) United States Patent
Nyberg et al.

(10) Patent No.: US 8,326,333 B2
(45) Date of Patent: Dec. 4, 2012

(54) ELECTRONIC DEVICE AND METHOD OF CONTROLLING THE ELECTRONIC DEVICE

(75) Inventors: Anders Nyberg, Malmo (SE); Daniel Appelquist, Malmo (SE)

(73) Assignee: Sony Ericsson Mobile Communications AB, Lund (SE)

( * ) Notice: Subject to any disclaimer, the term of this patent is extended or adjusted under 35 U.S.C. 154(b) by 337 days.

(21) Appl. No.: 12/616,386

(22) Filed: Nov. 11, 2009

(65) Prior Publication Data

US 2011/0111774 A1 May 12, 2011

(51) Int. Cl.
*H04W 4/00* (2009.01)
(52) U.S. Cl. .............. 455/466; 455/414.1; 455/566; 455/550.1
(58) Field of Classification Search ............ 455/466, 455/414.1, 414.4, 566, 550.1; 715/236, 254, 715/255; 704/8, 270
See application file for complete search history.

(56) References Cited

U.S. PATENT DOCUMENTS

| | | | |
|---|---|---|---|
| 5,805,911 A | 9/1998 | Miller | |
| 7,962,169 B2 * | 6/2011 | Fux et al. ................ | 455/550.1 |
| 8,010,338 B2 * | 8/2011 | Thorn ..................... | 704/8 |
| 2003/0125927 A1* | 7/2003 | Seme ...................... | 704/3 |
| 2006/0119583 A1* | 6/2006 | Potera .................... | 345/171 |
| 2007/0168450 A1* | 7/2007 | Prajapat et al. ........ | 709/207 |
| 2007/0265828 A1* | 11/2007 | Lorraine Scott et al. | 704/9 |
| 2008/0070604 A1* | 3/2008 | Castagnet .............. | 455/466 |
| 2009/0058823 A1* | 3/2009 | Kocienda ............... | 345/173 |
| 2009/0077464 A1* | 3/2009 | Goldsmith et al. .... | 715/257 |
| 2010/0159891 A1* | 6/2010 | Sigmund et al. ....... | 455/413 |

FOREIGN PATENT DOCUMENTS

| | | |
|---|---|---|
| CN | 1369830 | 9/2002 |
| CN | 1586066 | 2/2005 |
| DE | 102004059686 A1 | 6/2006 |
| EP | 1255184 A1 | 11/2002 |
| EP | 1480420 A1 | 11/2004 |
| EP | 1480421 A1 | 11/2004 |
| EP | 1901534 A1 | 3/2008 |
| WO | 00/57265 | 9/2000 |
| WO | WO 2006125660 A2 * | 11/2006 |
| WO | 2008/065546 A1 | 6/2008 |
| WO | 2008/125660 | 10/2008 |

OTHER PUBLICATIONS

International Search Report, corresponding to PCT/EP2010/064555, mailed Feb. 3, 2011.
Written Opinion of the International Searching Authority, corresponding to PCT/EP2010/064555, mailed Feb. 3, 2011. Office Action for copending U.S. Appl. No. 12/616,386 mailed Dec. 14, 2011.
International Search Report for PCT/EP2006/005025, dated Nov. 3, 2006.
Written Opinion of the International Searching Authority, or the Declaration, for PCT/EP2006/005025 dated Nov. 3, 2006.
"Microsoft Word 2000 Product Enhancements Guide" [online] Oct. 1998, retrieved from the Internet [retrieved on Oct. 5, 2005], paragraph [0006].
International Preliminary Report on Patentability, for PCT/EP2006/005025 dated Aug. 8, 2007.

* cited by examiner

*Primary Examiner* — Lester Kincaid
*Assistant Examiner* — Dung Lam
(74) *Attorney, Agent, or Firm* — Renner, Otto, Boisselle & Sklar, LLP

(57) ABSTRACT

A method of controlling an electronic device is disclosed. The electronic device is provided with functionality for composing and sending messages in accordance with at least one text-based messaging service. In response to execution on the electronic device of a message-composition process for composing a message to be sent to a recipient of the message via said text-based messaging service, a language configuration of the electronic device is set in conformance with language data associated with the recipient. Said language data indicates a language to be used for composing the message. A corresponding electronic device, computer program product, and computer-readable medium are also disclosed.

16 Claims, 4 Drawing Sheets

ELECTRONIC DEVICE AND METHOD OF CONTROLLING THE ELECTRONIC DEVICE

TECHNICAL FIELD

The present invention relates to an electronic device and a method of controlling the electronic device.

BACKGROUND

Electronic devices, such as mobile phones and the like, may be provided with functionality for composing, sending, and receiving messages in accordance with one or more text-based messaging services. Such text-based messaging services include email, short message service (SMS), multimedia messaging service (MMS), instant messaging services, and messaging services of various internet-based communities (or "social networks").

Such an electronic device may further have language-dependent settings, which may include a character set, a keyboard layout, a dictionary, and/or the like. Configuring the language-dependent settings to conform with a language to be used when composing a message of a text-based messaging service mentioned above may be a tedious and time-consuming task for a user of the electronic device, and may also cause annoyance for the user.

SUMMARY

According to a first aspect, there is provided a method of controlling an electronic device. The electronic device is provided with functionality for composing and sending messages in accordance with at least one text-based messaging service. The method comprises, in response to execution on the electronic device of a message-composition process for composing a message to be sent to a recipient of the message via said text-based messaging service, setting a language configuration of the electronic device in conformance with language data associated with the recipient. Said language data indicates a language to be used for composing the message.

The method may comprise, if the recipient is represented with a contact entry in a contact database stored in or accessible from the electronic device and said contact entry comprises data indicative of a preferred language of the recipient, fetching said data indicative of the preferred language from said contact entry as the language data associated with the recipient. Furthermore, setting the language configuration of the electronic device may comprise setting the language configuration of the electronic device in conformance with the preferred language of the recipient.

The method may comprise, if the message is a reply to an earlier incoming message from said recipient, processing the earlier incoming message for determining a main language of the earlier incoming message. Furthermore, the method may comprise generating data indicative of the determined main language of the earlier incoming message as the language data associated with the recipient. Moreover, setting the language configuration of the electronic device may comprise setting the language configuration of the electronic device in conformance with the determined main language of the earlier incoming message.

Setting the language configuration of the electronic device may comprise one or more of setting a keyboard layout of the electronic device in conformance with the language data;

setting a dictionary language of a predictive-text process of the electronic device in conformance with the language data;

setting a character set of the electronic device in conformance with the language data;

setting a language of a grammar-check process of the electronic device in conformance with the language data; and setting a dictionary language of a spell-check process of the electronic device in conformance with the language data.

The text-based messaging service may e.g. be an email service, a short message service (SMS), a multimedia messaging service (MMS), an instant messaging service, or a messaging service of an internet-based community.

According to a second aspect, there is provided an electronic device provided with functionality for composing and sending messages in accordance with at least one text-based messaging service. The electronic device comprises a control unit adapted to perform the method according to the first aspect.

The electronic device may e.g. be a portable communication device, such as but not limited to mobile phone.

According to a third aspect, there is provided a computer program product comprising computer program code for executing the method according to the first aspect when said computer program code is run by a programmable control unit of the electronic device.

According to a fourth aspect, there is provided a computer readable medium having stored thereon a computer program product comprising computer program code for executing the method according to the first aspect when said computer program code is run by a programmable control unit of the electronic device.

Further embodiments of the invention are defined in the dependent claims.

It should be emphasized that the term "comprises/comprising" when used in this specification is taken to specify the presence of stated features, integers, steps, or components, but does not preclude the presence or addition of one or more other features, integers, steps, components, or groups thereof.

BRIEF DESCRIPTION OF THE DRAWINGS

Further objects, features and advantages of embodiments of the invention will appear from the following detailed description, reference being made to the accompanying drawings, in which.

DETAILED DESCRIPTION

Figure 1:
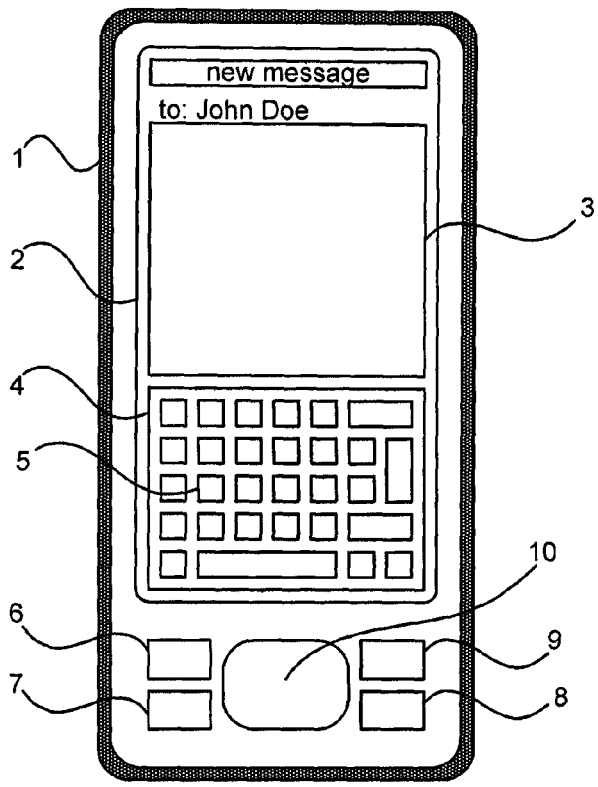
FIG. 1 is a view of an electronic device according to an embodiment of the present invention.

FIG. 1 is a view ("front view") of an electronic device 1 according to an embodiment of the present invention. The electronic device 1 is provided with functionality for composing and sending messages in accordance with at least one text-based messaging service. The text-base messaging service may be, but is not limited to, an email service, a short message service (SMS), a multimedia messaging service (MMS), an instant messaging service, or a messaging service of an internet-based community (or "social network"). The electronic device 1 may e.g. be a portable communication device, such as a mobile phone.

Figure 2:
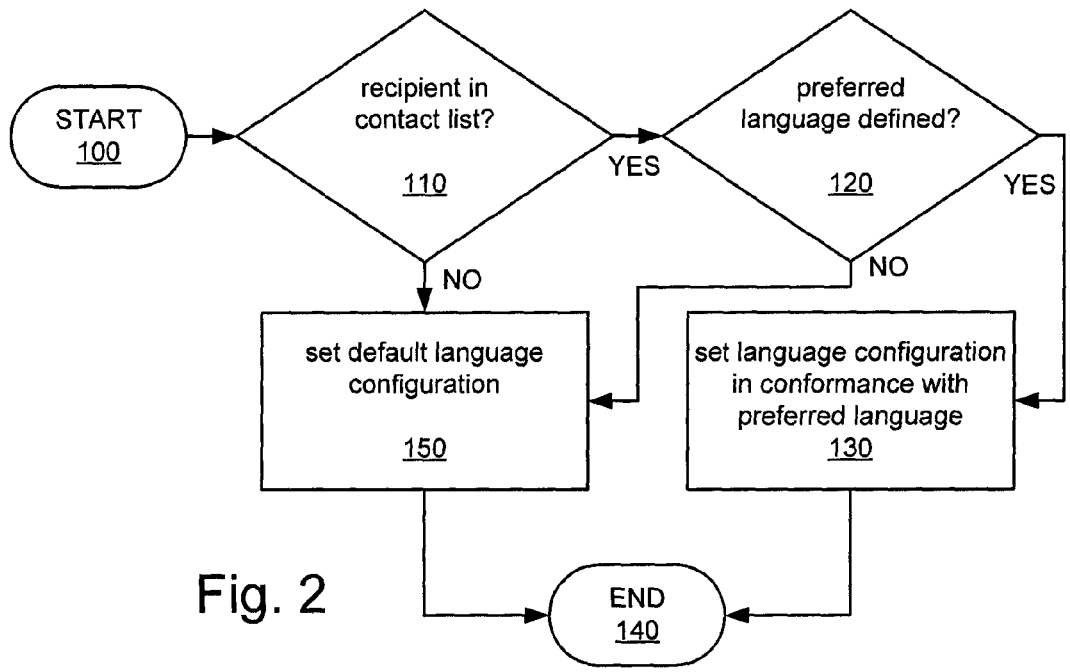
FIGS. 2-5 are flowcharts of methods according to embodiments of the present invention.

In the embodiment illustrated in FIG. 1, the electronic device 1 has a display 2. In FIG. 2, the display 2 is showing a graphical user interface (GUI) for composing a new message in the text-based messaging service according to an example. It should be emphasized that the shown GUI is merely an example and that numerous other interfaces may be used for composing the new message. The GUI shown in the display 2 has a message-composition window 3 in which the message is to be composed. Furthermore, as illustrated in FIG. 1, the GUI shown on the display 2 may have a virtual keyboard 4 having a number of virtual keys 5 that can be used by a user of the electronic device 1 for composing the message by tapping on the display e.g. with a finger or a stylus. Hence, the display 2 may be a touch screen. Additionally or alternatively, the electronic device 1 may comprise a number of physical keys 6-10, also illustrated in FIG. 1, which the user may use for composing the message.

According to embodiments of the present invention, the electronic device 1 has a language configuration that may be set in accordance with a language to be used for composing a message of the text-based messaging service. The term language configuration, when used herein, is referring to a language configuration to be used when composing a message of the text-based messaging service. In addition, the electronic device may have other language configurations, such as a main or global language configuration (e.g. a language configuration of an operating system of the electronic device). When setting the language configuration (to be used when composing a message of the text-based messaging service), such other language configurations may be left unaffected. The language configuration may define one or more of a keyboard layout of the electronic device 1, such as a layout of the virtual keyboard 4, a dictionary language of a predictive-text process (e.g. "T9") of the electronic device 1, a character set of the electronic device 1, a language of a grammar-check process of the electronic device 1, and a dictionary language of a spell-check process of the electronic device 1, but is not limited thereto.

According to some embodiments of the present invention, a method of controlling the electronic device 1 is provided. According to the method, the language configuration of the electronic device 1 is set in conformance with language data associated with a recipient of a message in response to execution on the electronic device 1 of a message-composition process for composing the message to be sent to the recipient of the message via the text-based messaging service. The language data indicates a language to be used for composing the message. Thereby, the language configuration may be set appropriately without manual intervention from the user, which provides for an improved ease of use of the electronic device 1.

According to some embodiments of the method, the language data may be comprised in a contact entry of a contact database (or "address book"). The contact database may e.g. fully or partly be stored in the electronic device 1. Alternatively or additionally, the contact database may be an external database that is accessible from the electronic device 1, e.g. via the internet. For example, the contact database may be a contact list of a web-based email account or a contact list of an account of an internet-based community. The contact entry may define, in various fields of the contact entry, various contact details of the recipient, such as address, email address, phone number, fax number, etc, as is known in the art. In addition, the contact entry may have a language field that comprises data indicative of the recipients preferred language. According to these embodiments, the method may comprise fetching said data indicative of the preferred language from said contact entry as the language data associated with the recipient. Furthermore, setting the language configuration of the electronic device may comprise setting the language configuration of the electronic device in conformance with the preferred language of the recipient. The preferred language may be set manually in the contact entry by the user of the electronic device 1. Alternatively, the preferred language may be preset, e.g. defined in an electronic business card (such as a vCard) that has been received earlier from the recipient of the message being composed. Further alternatively, the recipient may have a language specified in an account of an internet-based community and said language specification may be accessible by others, e.g. by the electronic device 1. Hence, the preferred language may be set automatically in the contact entry by the electronic device 1 in accordance with the specified language in the recipient's account of the internet-based community. Alternatively, the preferred language may be set automatically by the electronic device 1 based on other data in the contact entry, such as a country code of a phone number or a top domain of an email address, or based on a history of language configurations used for composing earlier messages to the same recipient.

FIG. 2 is a flowchart of such an embodiment of the method. The operation is started in step 100. In step 110, it is checked whether the recipient has a corresponding contact entry in the contact database. If so, the operation proceeds to step 120. In step 120, it is checked whether that contact entry defines any preferred language of the recipient, i.e. if the contact entry comprises any data indicative of the preferred language. If so, the operation proceeds to step 130, where the data indicative of the preferred language is fetched from the contact entry as the language data and the language configuration is set in conformance with the preferred language of the recipient. Thereafter, the operation of the method is ended in step 140.

If the result of the check in step 110 is negative, e.g. if the recipient does not have a corresponding contact entry in the contact data base, or if no recipient has been entered for the message, the operation follows the NO branch from step 110 to step 150. Similarly, if the result of the check in step 130 is negative, i.e. the contact entry of the recipient does not define a preferred language of the recipient, the operation follows the NO branch from step 130 to step 150. In step 150, the language configuration is set to a default language configuration, e.g. based on a global language setting of the electronic device 1 or of an operating system of the electronic device 1. Thereafter, the operation of the method is ended in step 140.

According to some embodiments of the method, wherein the message to be composed is a reply to an earlier incoming message from said recipient, the language data may be generated based on the content of the incoming earlier message. According to these embodiments, the method may comprise processing the earlier incoming message for determining a main language of the earlier incoming message. The main language may e.g. be determined based on statistics of the text in the earlier incoming message. For example, the words of the earlier incoming messages may be compared with dictionaries for different languages. The main language may e.g. be determined as the language of the dictionary that has the most words in common with the text of the incoming message. Additionally or alternatively, other statistical data such as frequency of occurrence of different characters in the earlier incoming message, which is normally different for different languages, may be used as a basis for the determination of the main language. Further alternatively or additionally, the main language of the earlier incoming message may have been specified in the earlier incoming message as metadata, and the determination of the main language of the earlier incoming message may include extracting that metadata from the earlier incoming message. Hence, when composing an outgoing message, an indication of a main language or preferred language may be set in metadata of the message for facilitating the use of embodiments of the methods described herein when replying to that message. Such metadata may e.g. be set manually by the user composing the message, or automatically, e.g. based on a default language preset earlier by the user.

Furthermore, these embodiments of the method may comprise generating data indicative of the determined main language of the earlier incoming message as the language data associated with the recipient. Moreover, according to these embodiments of the method, setting the language configuration of the electronic device 1 may comprise setting the language configuration of the electronic device 1 in conformance with the determined main language of the earlier incoming message.

Figure 3:
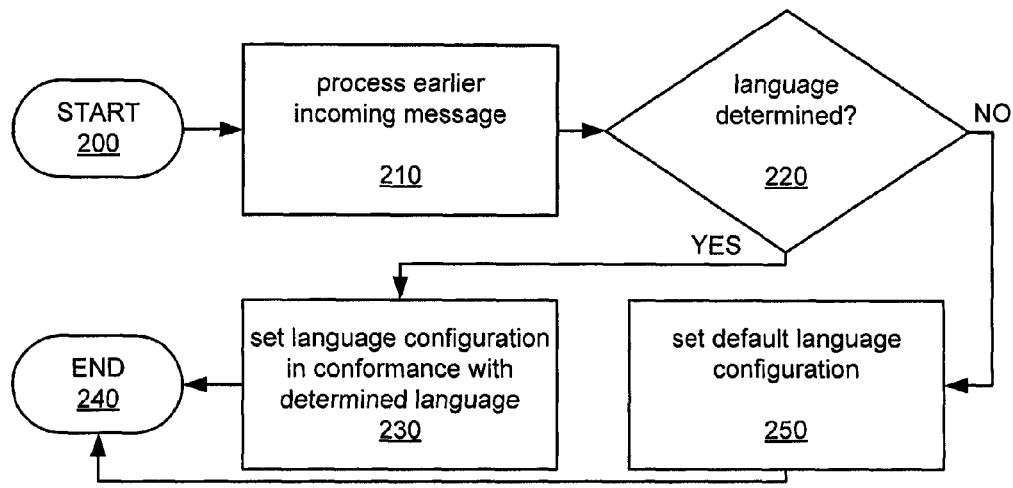

FIG. 3 is a flowchart of such an embodiment of the method. The operation is started in step 200. In step 210, the earlier incoming message is processed for determining the main language of the earlier incoming message. Furthermore, if the determination is successful, the language data associated with the recipient (of the message being composed) is also generated in step 210 as data indicative of the main language of the earlier incoming message. In step 220, it is checked whether a main language was successfully determined in step 210. If so, the operation proceeds to step 230. In step 230, the language configuration is set in conformance with the determined main language of the earlier incoming message. Thereafter, the operation is ended in step 240.

If the result of the check in step 220 is negative, i.e. no main language of the earlier incoming message could be determined in step 210, the operation instead follows the NO branch from step 220 to step 250. In step 250, the language configuration is set to a default language configuration as in step 150 (FIG. 2). Thereafter, the operation is ended in step 240.

The steps of the various embodiments described above may be combined in various ways, as is illustrated below with example embodiments with reference to FIGS. 4 and 5.

Figure 4:
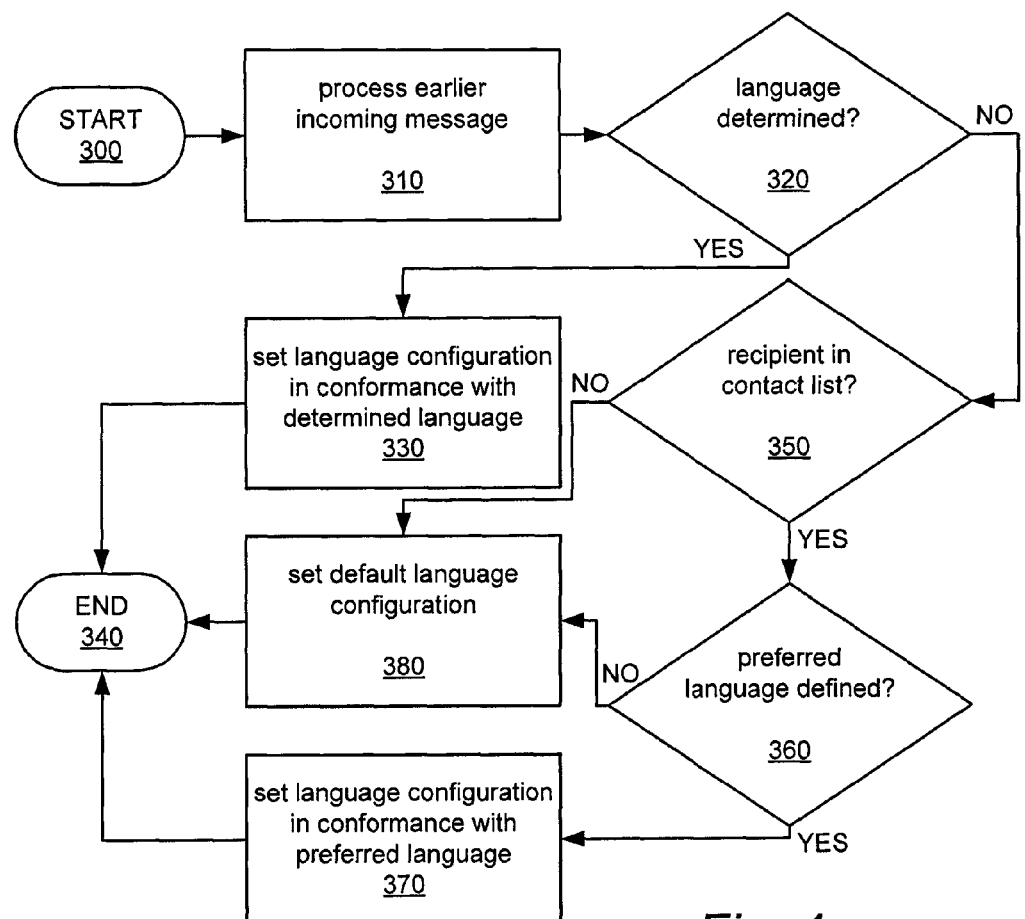

FIG. 4 illustrates an embodiment of the method wherein the earlier incoming message is first processed for determining a main language of the earlier incoming message. If the determination of the main language of the earlier incoming message is successful, the language configuration is set in conformance with the main language of the earlier incoming message. If, on the other hand the determination of the main language of the earlier incoming message is not successful, the contact database is instead consulted for determining a preferred language of the recipient. If this determination is successful, the language configuration is set in conformance with the preferred language of the recipient. If the determination of the preferred language of the recipient is not successful, the language configuration is set to a default language configuration.

The operation of the embodiment is started in step 300 and ended in step 340. Steps 310, 320, and 330 correspond to steps 210, 220, and 230 (FIG. 3), respectively. Furthermore, steps 350, 360, 370, and 380 correspond to the steps 110, 120, 130, and 150 (FIG. 2), respectively. Therefore, these steps are not further described in detail in the context of FIG. 4.

Figure 5:
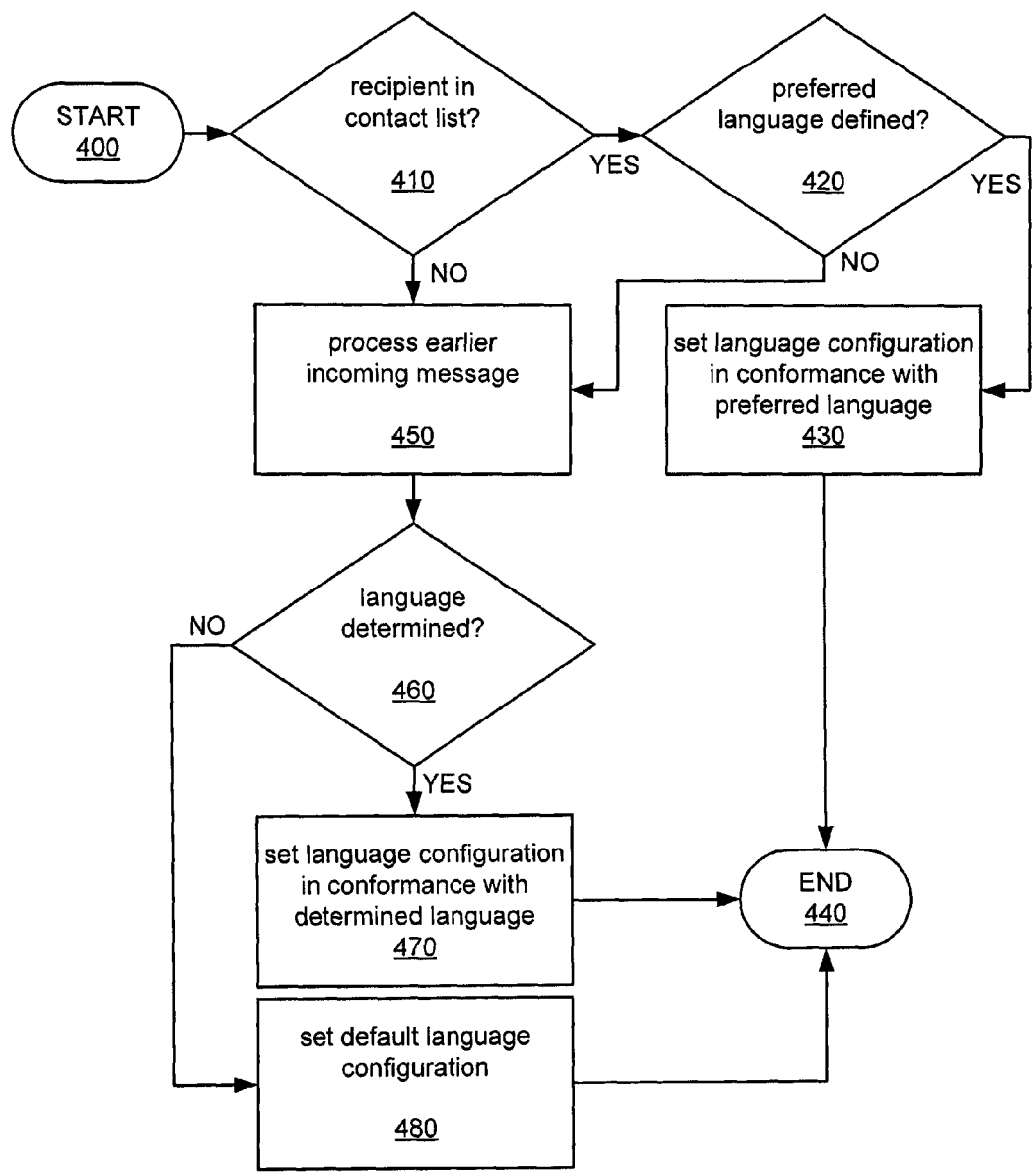
Figure 6:
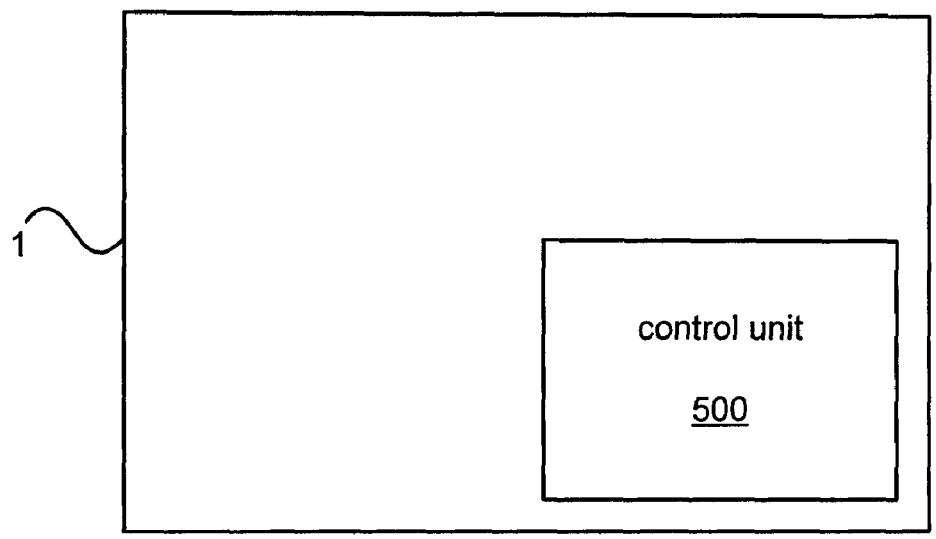
FIG. 6 schematically illustrates an electronic device comprising a control unit according to an embodiment of the present invention.

FIG. 5 illustrates an embodiment of the method wherein the contact database is first consulted for determining a preferred language of the recipient. If this determination is successful, the language configuration is set in conformance with the preferred language of the recipient. If, on the other hand, the determination of the preferred language of the recipient is not successful, the earlier incoming message is instead processed for determining a main language of the earlier incoming message. If the determination of the main language of the earlier incoming message is successful, the language configuration is set in conformance with the main language of the earlier incoming message. If the determination of the main language of the earlier incoming message is not successful, the language configuration is set to a default language configuration.

The operation of the embodiment is started in step 400 and ended in step 440. Steps 410, 420, and 430 correspond to the steps 110, 120, and 130 (FIG. 2), respectively. Furthermore, the steps 450, 460, 470, and 480 correspond to the steps 210, 220, 230, and 250 (FIG. 3), respectively. Therefore, these steps are not further described in detail in the context of FIG. 5.

Setting the language configuration in conformance with the language data may comprise one or more of setting a keyboard layout of the electronic device in conformance with the language data, setting a dictionary language of a predictive-text process of the electronic device in conformance with the language data, setting a character set of the electronic device in conformance with the language data, setting a language of a grammar-check process of the electronic device in conformance with the language data, and setting a dictionary language of a spell-check process of the electronic device in conformance with the language data, but is not limited thereto.

According to some embodiments of the present invention, the electronic device 1 may comprise a control unit that is adapted to perform the method described above with reference to various embodiments. This is schematically illustrated in FIG. 1 with a control unit 500 comprised in the electronic device 1.

Figure 7:
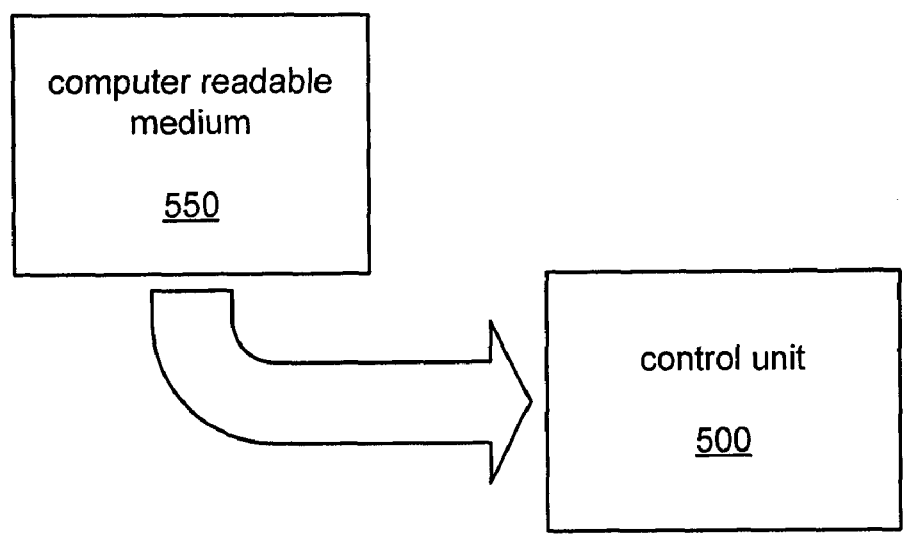
FIG. 7 schematically illustrates a computer-readable medium and a control unit according to an embodiment of the present invention.

The control unit 500 may be implemented as an application-specific hardware unit. Alternatively, the control unit 500 or parts thereof may be implemented using one or more configurable or programmable hardware units, such as but not limited to one or more field-programmable gate arrays (FPGAs), processors, and/or microcontrollers. In other words, the control unit 500 may be a programmable control unit. Hence, embodiments of the present invention may be embedded in a computer program product, which enables implementation of the method and functions described herein, e.g. the embodiments of the method described above. Therefore, according to embodiments of the present invention, there is provided a computer program product, comprising instructions arranged to cause the programmable control unit 500, to perform the steps of any of the embodiments of the method described above. The computer program product may comprise program code which is stored on a computer readable medium 550, as schematically illustrated in FIG. 7, which can be loaded and executed by the programmable control unit, to cause it to perform the steps of any of the embodiments of the method described above.

The present invention has been described above with reference to specific embodiments. However, other embodiments than the above described are possible within the scope of the invention. Different method steps than those described above, performing the method by hardware or software, may be provided within the scope of the invention. The different features and steps of the embodiments may be combined in other combinations than those described. The scope of the invention is only limited by the appended patent claims.

The invention claimed is:

1. A method of controlling an electronic device provided with functionality for composing and sending messages in accordance with at least one text-based messaging service, comprising,
    in response to execution on the electronic device of a message-composition process for composing a message to be sent to a recipient of the message via said text-based messaging service,
    setting a language configuration of the electronic device in conformance with language data associated with the recipient, wherein said language data indicates a language to be used for composing the message,
    wherein setting the language configuration of the electronic device comprises setting a keyboard layout of a virtual keyboard displayed on a display of the electronic device in conformance with said language data,
    wherein when the message is a reply to an earlier incoming message from said recipient, processing the earlier incoming message;
    when a main language of the earlier incoming message can be determined in said processing, setting the language configuration of the electronic device in conformance with the determined main language of the earlier incoming message; and
    when a main language of the earlier incoming message cannot be determined in said processing verifying whether the recipient is associated with a contact entry in a contact database stored in or accessible from the electronic device and whether said contact entry comprises data indicative of a preferred language of the recipient.

2. The method according to claim 1, comprising, if the recipient is represented with a contact entry in a contact database stored in or accessible from the electronic device and said contact entry comprises data indicative of a preferred language of the recipient
    fetching said data indicative of the preferred language from said contact entry as the language data associated with the recipient; wherein
    setting the language configuration of the electronic device comprises setting the language configuration of the electronic device in conformance with the preferred language of the recipient.

3. The method according to claim 1, comprising, if the message is a reply to an earlier incoming message from said recipient,
    processing the earlier incoming message for determining a main language of the earlier incoming message; and
    generating data indicative of the determined main language of the earlier incoming message as the language data associated with the recipient; wherein
    setting the language configuration of the electronic device comprises setting the language configuration of the electronic device in conformance with the determined main language of the earlier incoming message.

4. The method according to claim 1, wherein setting the language configuration of the electronic device comprises setting a dictionary language of a predictive-text process of the electronic device in conformance with the language data.

5. The method according to claim 1, wherein setting the language configuration of the electronic device comprises setting a character set of the electronic device in conformance with the language data.

6. The method according to claim 1, wherein setting the language configuration of the electronic device comprises setting a language of a grammar-check process of the electronic device in conformance with the language data.

7. The method according to claim 1, wherein setting the language configuration of the electronic device comprises setting a dictionary language of a spell-check process of the electronic device in conformance with the language data.

8. The method according to claim 1, wherein the text-based messaging service is
    an email service;
    a short message service, SMS;
    a multimedia messaging service, MMS;
    an instant messaging service; or
    a messaging service of an internet-based community.

9. An electronic device provided with functionality for composing and sending messages in accordance with at least one text-based messaging service, wherein the electronic device comprises a control unit adapted to perform the method according to claim 1.

10. The electronic device according to claim 9, wherein the electronic device is a portable communication device.

11. The electronic device according to claim 10, wherein the portable communication device is a mobile phone.

12. A non-transitory computer readable medium having stored thereon a computer program product comprising computer program code for executing the method according to claim 1 when said computer program code is run by a programmable control unit of the electronic device.

13. The method according to claim 1, further comprising:
    setting the language configuration of the electronic device in conformance with the preferred language of the recipient in the contact entry when all of the following conditions are fulfilled:
        the main language of the earlier incoming message cannot be determined in said processing,
        the recipient is associated with a contact entry in said contact database, and
        said contact entry comprises data indicative of a preferred language of the recipient.

14. The method according to claim 2,
    wherein said contact database is provided externally of the electronic device.

15. The method according to claim 14,
    wherein the electronic device fetches said data indicative of the preferred language from said contact entry over the internet.

16. The method according to claim 14,
    wherein said contact database is a contact database of an internet-based community.

* * * * *